United States Patent [19]
Fielder et al.

[11] Patent Number: 5,963,646
[45] Date of Patent: Oct. 5, 1999

[54] SECURE DETERMINISTIC ENCRYPTION KEY GENERATOR SYSTEM AND METHOD

[75] Inventors: Guy L Fielder, Houston; Paul N Alito, Austin, both of Tex.

[73] Assignee: The PACid Group, Austin, Tex.

[21] Appl. No.: 09/221,421

[22] Filed: Dec. 28, 1998

Related U.S. Application Data

[63] Continuation of application No. 08/813,992, Mar. 10, 1997.

[51] Int. Cl.⁶ .................................................. H04L 9/00
[52] U.S. Cl. ............................................ 380/21; 380/44
[58] Field of Search ................................. 380/4, 21, 25, 380/30, 44, 28

[56] References Cited

U.S. PATENT DOCUMENTS

| | | | |
|---|---|---|---|
| 5,050,212 | 9/1991 | Dyson | 380/25 |
| 5,453,598 | 9/1995 | Kaufman et al. | 380/44 |
| 5,664,016 | 9/1997 | Freneel et al. | 380/28 |
| 5,694,569 | 12/1997 | Fischer | 380/4 |
| 5,748,738 | 5/1998 | Bisbee et al. | 380/30 |

*Primary Examiner*—Salvatore Cangialosi
*Attorney, Agent, or Firm*—Gerald E. Lester

[57] ABSTRACT

An encryption key generator is disclosed which is highly resistant to cryptographic analysis or brute force attacks, and which accommodates the destruction of an encryption key after each use by providing for the recreation of the key without need of key directories or other encryption key storage processes. A constant value and a secret E-Key Seed are applied as inputs to a bit-shuffling algorithm to provide a first many-to-few bit mapping and produce a first pseudo-random number. The first pseudo-random number in turn is applied as an input to a secure one-way hash algorithm to provide a second many-to-few bit mapping and produce a second pseudo-random number or message digest that may be truncated to a desired bit length to serve as a non-predictable but deterministic encryption key. Same constant value and E-Key Seed inputs to the key generator will provide the same message digest and hence the same key.

27 Claims, 5 Drawing Sheets

ND METHOD

SECURE DETERMINISTIC ENCRYPTION KEY GENERATOR SYSTEM AND METHOD

RELATED APPLICATIONS

This application is a continuation of U.S. patent application Ser. No. 08/813,922 filed on Mar. 10, 1997.

Copending applications filed on the same date and having same inventors are "Bilateral Authentication And Information Encryption Token System And Method", Ser. No. 08/815,403; "Bilateral Authentication And Encryption System And Method ", Ser. No. 08/813,457; and "File Encryption Method And System", Ser. No. 08/813,459, all now pending.

FIELD OF THE INVENTION

The invention relates generally to an encryption key generator, and more particularly to a generator which produces a non-predictable but deterministic encryption key that is highly resistant to cryptographic analysis and brute force attacks to discover the secret seeds to the generator.

BACKGROUND OF THE INVENTION

Security of information used in early computer systems, which included a mainframe central processing unit (CPU) with user access being provided through dumb terminals, was accomplished by restricting access to the CPU. The CPU was the arbitrator of all computing resources involving sensitive information.

The introduction of the personal computer (PC) marked the beginning of a migration toward local rather than central processing, and the advent of client/servers. Again, conventional wisdom at first taught that sensitive information could be protected by restricting access to tile PC or client server.

Today's communications world is one of distributed computing, portable PCs with gigabyte memories, and LAN, WAN, Internet and cellular communications. Central CPU, client/server, and PC security is no longer sufficient to protect highly sensitive information.

The most widely accepted method of protecting information stored in a computer system or communicated over networks is the use of data encryption. Data encryption technology is basically classified into two technology types: symmetric or asymmetric. An example of a symmetric algorithm encryption is the Data Encryption Standard, FIPS PUB 46-2; DATA ENCRYPTION STANDARD (DES), Dec. 30, 1993. The RSA encryption technology named for its inventors, Rivest, Shamir, and Adleman, is an example of asymmetric or public key encryption.

Symmetric encryption uses the same key to both encrypt and decrypt an information file. Asymmetric encryption uses two keys which share a relationship such that information encrypted with one key can be decrypted only with the second key. Symmetric encryption is much faster than asymmetric encryption, and is therefore better suited for bulk encryption of data files.

Encryption algorithms further may be characterized as being either reversible or irreversible. Symmetric and asymmetric encryption algorithms are reversible. A reversible algorithm is one where data is recoverable from its encrypted state back to its cleartext state. An example of an irreversible algorithm is the secure hash algorithm as defined in FIPS PUB 180-1, SECURE HASH STANDARD (SHS), Apr. 17, 1995 Secure hash algorithms were originally used to detect alterations to an information file, whether intentional or unintentional. It is not surprising, therefore, that the output of the algorithm is called a message integrity code (MIC) or message digest (MD). Another characteristic of a hash algorithm is that the output is always the same binary length regardless of the size of the input. Thus, an input having a large binary length may be mapped to an output having a shorter binary length. Further, if only one bit in a message or file is changed, approximately 50% of the bits in the output change. There is no known relationship between the input and output of a hash algorithm which may be used to recover the input from the output. Thus, even brute force trial-and-error attacks become prohibitive in time and cost.

Encryption keys produced by a key generator further may be classified as deterministic or non-deterministic. A deterministic encryption key is one which is repeatable each time a specific input is applied to the encryption key generator. Different inputs produce different outputs. A non-deterministic encryption key is one which cannot be repeated with a same input to the key generator, For example, a random number generator provides a non-deterministic result.

The collective wisdom of the information security industry is that deterministic encryption keys are unsatisfactory because they are susceptible to cryptographic analysis. Such an analysis may reveal the inputs to an encryption algorithm which are required to generate an encryption key.

In order to introduce a higher degree of irreversibility, secure one-way hash functions such as that defined in "Secure Hash Standard", FIPS PUB 180-1 (Apr. 17. 1995), have been introduced into the key generation process. Since the bit length of the output of the secure hash algorithm remains the same no matter the bit length of the input, and the change in a single bit of the input dramatically affects the output, the output of a secure hash function is considered to be near irreversible because of the investment in time and cost necessary to reveal the inputs through brute force trial-and-error methods.

Typical of encryption key generators used in prior systems are those disclosed in U.S. Pat. Nos. 5,060,263; 5,068, 894; 5,153,919; 5,233,655; 5,309,516; 5,355,413; 5,361, 062; and 5,367,572. None of these systems employ a many-to-few bit mapping to enhance the irreversibility of the encryption algorithm being used, and none except possibly the '516 and '919 patents employ irreversible algorithms. The '516 and '919 patents do not disclose the algorithms being used. Further, the encryption keys generated by the '263, '894, '655, '062 and '572 patents are not repeatable or deterministic. In addition, the secret input to the key generator disclosed in the '263, '894, '919, '655, '413, '062, and '572 patents are not sufficiently large to forestall discovery through cryptographic analysis. Lastly, the encryption keys generated in the '655, '062, and '572 patents do not serve as symmetric encryption keys.

Of the above patents, U.S. Pat. No. 5,153,919 appears to be the nearer prior art in that the disclosed encryption key generator requires the input of a constant value (ESN), a secret key (A-Key), and a random sequence which are merely concatenated before being hashed to provide a shared secret data field (SSD). The method of generation, however, does not employ an A-Key of sufficient bit length or a bit-shuffling operation as contemplated by the present invention prior to the hashing operation. No meaningful barrier against discovery of the inputs to the concatenation function, therefore, is provided. The disclosed method and system do not employ a many-to-few bit mapping to further resist against brute force trial-and-error attacks ,and against a cryptographic analysis attempts to discover the secrets of the encryption key generator function.

In the present invention, a method and system for generating a non-predictable but deterministic and symmetric encryption key is disclosed, which employs a many-to-few bit mapping and a combination bit-shuffle and secure hash to become highly resistant to cryptographic analysis and brute force trial-and-error attacks. The method and system further is highly resistant to attempts to discover the encryption key from knowledge of inputs of the key generator, and employs a secret E-Key Seed that is of sufficient bit length to be highly resistant to discovery through cryptographic analysis. The method and system of the present invention also substantially raise the efficiency of information security systems by accommodating the destruction of an encryption key after each use, and by recreating the key without need of key directories or other key records.

SUMMARY OF THE INVENTION

A method and system is disclosed for generating a deterministic but non-predictable symmetric encryption key which is highly resistant to cryptographic analysis or brute force attacks to discover the E-Key Seed of the encryption key generator. More particularly, the bits of a constant value or message are logically, cryptographically and/or algebraically combined with the bits of a secret plural bit sequence (E-Key Seed) to provide a bit-shuffling which results in the mapping of a large number of bits into a first pseudo-random number having fewer bits. The resulting bit sequence then is applied through a secure hash function for increased irreversibility. The message digest in turn may be truncated to a desired bit length to provide a repeatable, non-predictable but deterministic, and pseudo-random symmetric encryption key.

In one aspect of the invention, the encryption key produced by the encryption key generator may be reproduced by applying same inputs to the generator. The need for key directories or key records thereby is obviated.

In another aspect of the invention, attempts to discover the E-Key Seed of the encryption key generator through cryptographic analysis or brute force attacks is thwarted by having one input, the secret E-Key Seed, held in secret and consisting of a plural bit sequence of at least 224 bits, by algebraically combining the bits of the E-Key Seed and the constant value to provide a many-to-few bit mapping result as a pseudo-random input to the secure hash algorithm, and by applying the combination through a secure hash function which enhances the irreversibility of the pseudo-random encryption key output.

In still another aspect of the invention, the E-Key Seed and constant value may be combined through a sequence of logic, algebraic, and/or cryptographic steps to provide an input to the secure hash function.

In a further aspect of the invention, the E-Key Seed and constant value may be encrypted to provide an input to the secure hash function.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Preferred embodiments of the invention will now be described with reference to the accompanying drawings.

The common Achilles heel of prior cryptographic systems is the key management system, which cryptoanalysts have found to be an easier target for discovering encryption keys than attempting to crack the encryption itself. Contemporaneous encryption key management systems may be categorized as manual (where a key manager provides encryption keys to users as they are needed to encrypt or decrypt files), semi-automated (where access to encrypted files stored in a computer memory requires access by way of an encrypted key to a key directory stored on a floppy disk or a hard disk), or automated as described in connection with the description of FIG. 1 below.

Figure 1:
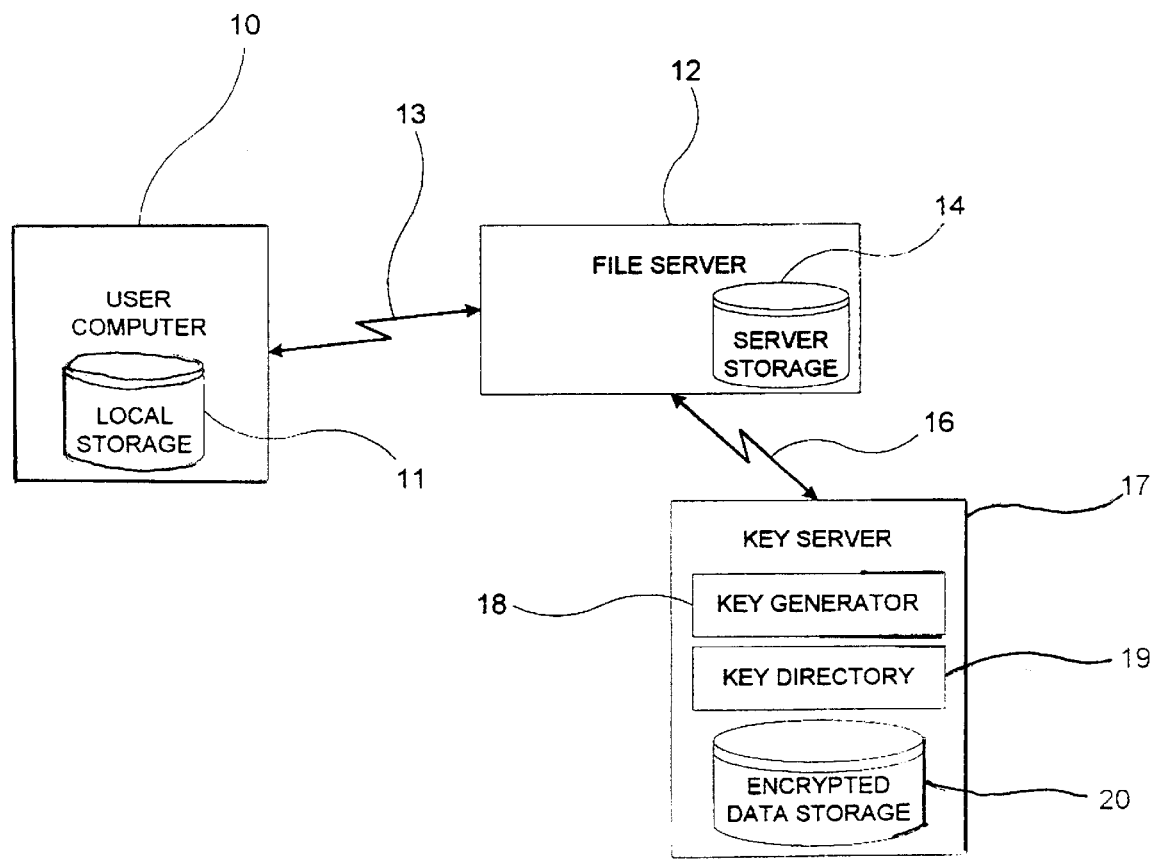
FIG. 1 is a functional block diagram of a conventional computer network system in which an encryption key generator is used to protect encrypted data.

Referring to FIG. 1, a user computer 10 with a local storage 11 accesses a file server 12 by way of a communications link 13. A user at computer 10 may through a user authentication process gain access to the server 12 and server storage 14, but not to sensitive files stored in the key server system 17 which is accessed by the server 12 by way of a communications link 16.

The user must undergo an additional authentication process with the key server 17 in order to gain access to the key generator 18, the key directory 19, and the encrypted storage 20. Once authenticated by the key server system 17, the user has access to the key generator 18, the key directory 19, and the encrypted data storage 20. Upon obtaining the encryption key for a particular file from the key directory 19, the user may decrypt the file in encrypted storage 20 which is associated with the encryption key.

Conventional manual, semi-automated, and automated systems require that a key directory be created and maintained. Many such systems include an additional security feature by having a backup key directory that also is maintained and thus discoverable.

Figure 2:
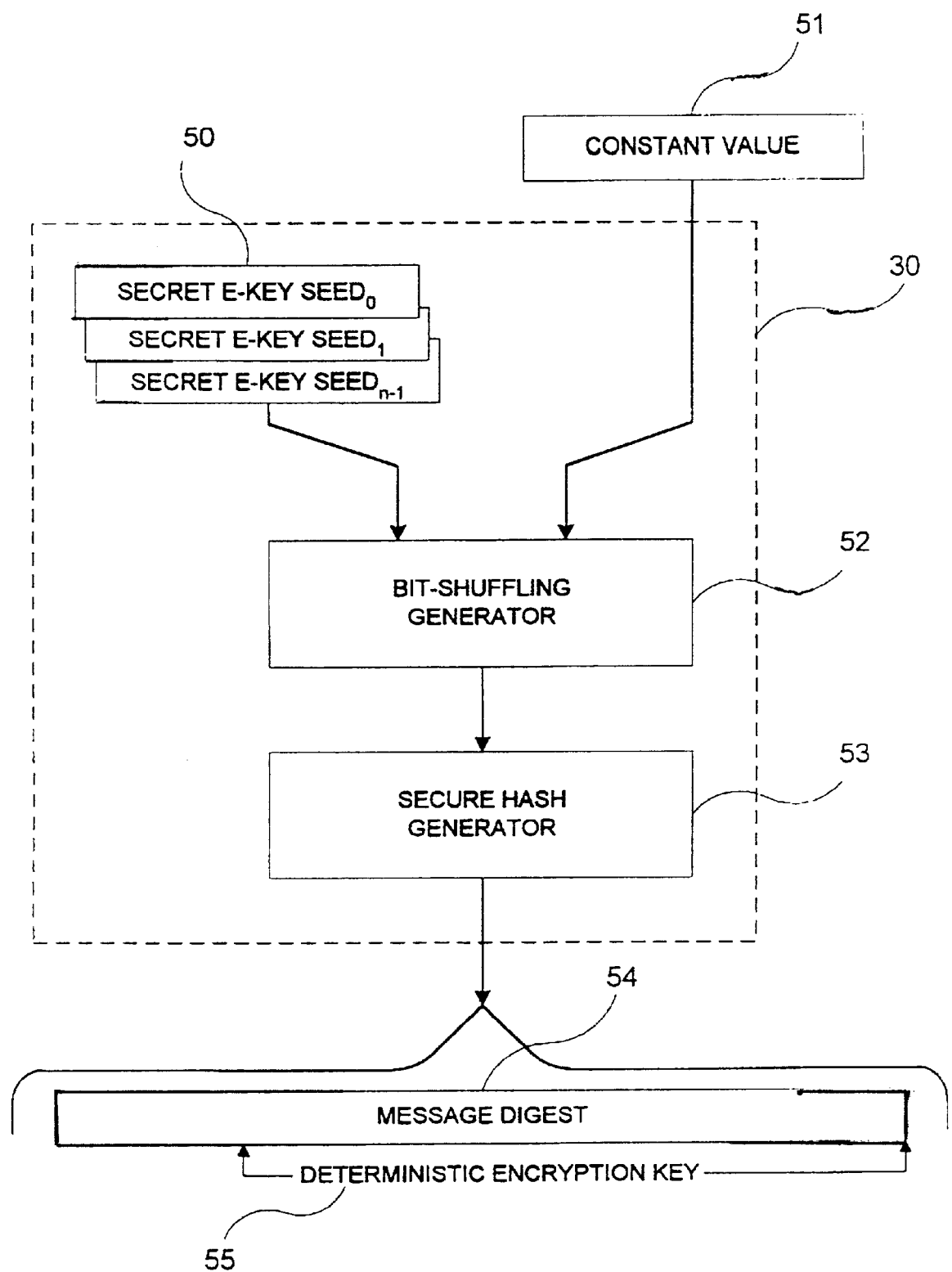
FIG. 2 is an illustration of the functions performed by the encryption key generator of the present invention.

An encryption key generator which obviates the need for key management systems is illustrated in FIG. 2. The generator is designed to be highly resistant to brute force trial-and-error cryptoanalytic attempts to discover the secret seed that is needed to be able to recreate an encryption key.

Referring to FIG. 2, an E-Key Seed 50 and constant value 51 are combined by a bit-shuffling generator 52 that executes an algebraic, cryptographic and/or logic function, which by way of example but not limitation may be the equation A⊕B=C, where A is the E-Key Seed 50 and B is the constant value 51. The bits of the E-Key Seed and the constant value thereby are randomly mixed and mapped to a result C of fewer total bits than the combination of the E-Key Seed and the constant value. The result C is a pseudo-random bit sequence which is applied as an input to a secure hash function generator 53, which in turn produces a second pseudo-random bit sequence referred to as a message digest 54. As before stated, the bit length of the output of the hash function generator 53 remains the same irrespective of the bit length of the input. In the preferred embodiment described herein, the bit length of the input is substantially larger than the output to effect a many-to-few bit mapping to enhance the irreversibility of the encryption key which is generated. The message digest may be truncated to a desired bit length 55 to become the deterministic encryption key that is being sought.

The term "pseudo-random" as used in this specification means that the output referred to is repeatable and predictable to anyone who knows the E-Key seed input to the function producing the output. Without such knowledge, the output appears to be totally random.

The hash algorithm performed by the function generator 53 provides a deterministic and repeatable result. That is, when a same input is used, the same output results. Thus, so long as the secret E-Key seed 50 and the constant value 51 are known, the encryption key may be recreated. The output changes dramatically, however, if even one bit of the input is changed. The hash function itself may be any of the well-known hash functions including those set forth in Table I below. In the preferred embodiment, the SHA or secure hash algorithm is used and the truncated bit length 55 may be less than or equal to the bit length of the message digest 54.

TABLE I

| HASH FUNCTION | HASH LENGTH |
|---|---|
| Abreast Davies-Meyer (with IDEA) | 128 |
| Davies-Meyer (with DES) | 64 |
| GOST Hash | 256 |
| HAVAL | Variable |
| MD5 | 128 |
| N-HASH | 128 |
| RIPE-MD | 128 |
| SHA | 160 |
| SNEERU | 128 |

It is to be understood that the algebraic function executed by the function generator 52, where two inputs which collectively are comprised of a large number of bits are subjected to a bit-shuffling mapping to form an output comprised of fewer bits, can be any of numerous other logic, cryptographic, or algebraic functions that would protect the E-Key Seed from being discovered. This property of many bits being mapped to substantially fewer bits makes an analytical attack to discover the inputs from the output much more difficult for an outright brute force attack by computer.

The size of the E-Key Seed used in the preferred embodiment was determined by considering that information is to be protected for a man's lifetime (about 74.5 years) that the compute power available to mount a brute force attack on an encryption key is able to test keys at a rate of one billion per second, that computer processing power doubles about every 1.5 years (which translates to increasing the encryption key size by 50 bits over a lifetime), and that one bit had to be added to the key bit length to double the key range in light of statistical averaging (which will support the theory that a key possibly could be found after testing only half of the possible values). An encryption key lower limit of 112 bits thus was determined to be required to resist cryptographic attack for approximately one life time. An E-Key Seed having a bit length double that of the encryption key, or 224 bits, thus was deemed a reasonable compromise between cryptographic strength and the economy of a secure memory.

The irreversibility of the encryption key was made even more difficult by using a secure hash algorithm, which has the property of changing on average approximately 50 percent of its output bits when only a single bit in the input is changed. In the preferred embodiment described herein, the SHA secure hash algorithm is used, which has the property that any input between $2^0$ and $2^{64}$ bits in length will produce a message digest of 160 bits in length.

Also in the preferred embodiment, an attacker can have knowledge of the constant value 51, the generator 52, and the secure hash generator 53. He will not know the E-Key Seed, the bit length of the E-Key Seed, or the encryption key result when the constant value 51 is fed into the key generator 30 of FIG. 2. Further, cryptographic analysis of the output of a secure hash algorithm is made exceedingly difficult and costly in time and computer resources, since there is no known correlation between the input and the output of the algorithm. A brute force trial-and-error attack would be even more prohibitive in time and cost.

No matter how mathematically improbable, if an encryption key were discovered, the attacker would still face the task of reversing a bit-shuffling algorithm where a small number of output bits must be reverse mapped to an unknown but larger number of input bits.

Even if the bit length of the E-Key Seed were known, there would be $2.7 \times 10^{67}$ possibilities—a number which is between the projected total lifetime of the Universe in seconds ($2^{61}$) and the number of atoms in the Earth ($2^{170}$).

In accordance with the invention, a unique deterministic encryption key derived from the constant 51 and the secret E-Key Seed 50 is produced which is truly pseudo-random, and which is highly resistant to brute force attacks and cryptographic analysis to discover secret E-Key Seed inputs to the encryption key generator. However, same inputs to the algorithm provide same outputs. Thus, the encryption key may be regenerated, and the need for a key directory is obviated.

Figure 3:
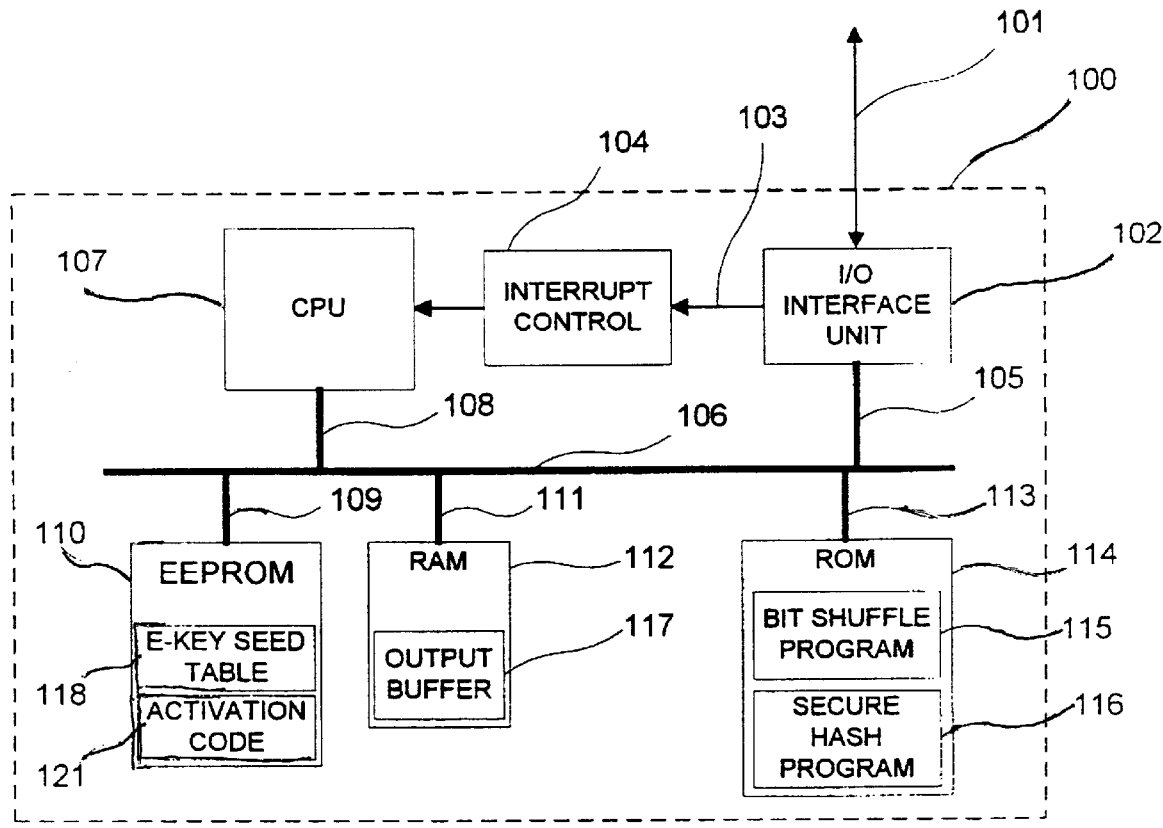
FIG. 3 is a functional block diagram of a system with an encryption key generator in accordance with the invention.

Referring to the functional block diagram of FIG. 3, an encryption key generator system 100 is illustrated with a communication bus 101 which is electrically connected to an I/O interface unit 102. Unit 102 in turn is electrically connected by way of a conducting line 103 to an interrupt control unit 104, and by way of a 15 bit bus 105 to an 8 bit address, data and control bus 106.

The Interrupt control unit 104 is electrically connected to an 8 bit, 4.0 MHz CPU 107, which in turn is electrically connected by way of a 23-bit bus 108 to the bus 106. The bus 106 further is electrically connected by way of a 23-bit bus 109 to a non-volatile, 8160 byte, Electrically Erasable Programmable Read Only Memory (EEPROM) 110 in which is stored an E-Key Seed table 118. The bus 106 still further is electrically connected by way of a 23-bit bus 111 to a 246 byte volatile RAM 112, and by way of a 23-bit bus 113 to a 12800 byte ROM 114. Firmware defining the operation of the CPU 107, and including a bit-shuffle program 115 and a secure hash program 116, is stored in the ROM 114.

In operation, a host system (not shown) inputs commands and data to the key generator system 100, and receives status information and processing results from CPU 107 by way of communication bus 101. When information from the host system is written into the I/O interface unit 102, an interrupt is generated by the interrupt control unit 104. In response to the interrupt, the CPU 107 exits from a wait-state and executes a command interpreter program stored in the ROM 114. As a result, the information which has been written into the I/O interface unit 102 is stored in the operating RAM 112.

In response to a constant value 51 and a command sent by a host system (not shown) and stored in RAM 112 to direct the generation of an encryption key, the CPU 107 accesses the E-Key Seed table 118 stored in EEPROM 110. An E-Key Seed corresponding to an E-Key Seed ID thereby is retrieved, and the bit-shuffle program 115 stored in the ROM 114 is executed. Thereafter, the output of the bit-shuffle program is stored in RAM 112. The CPU next acquires the secure hash program 116 stored in ROM 114 and the bit-shuffle output stored in RAM 112, and executes the secure hash program to produce a message digest. The message digest then is written into the I/O Interface unit 102 for access by the host system by way of the communication bus 101. The host system may truncate the message digest to produce an encryption key.

In the preferred embodiment described herein, the system of FIG. 3 may be purchased as part number MC68HC05SC28 from Motorola Semiconductor Product Sector Headquarters located at 3102 North 56th Street, Phoenix, Ariz. 85018. The timing parameters and transmission protocols for the system are in accordance with ISO/IEC 7816-3.

Figure 4:
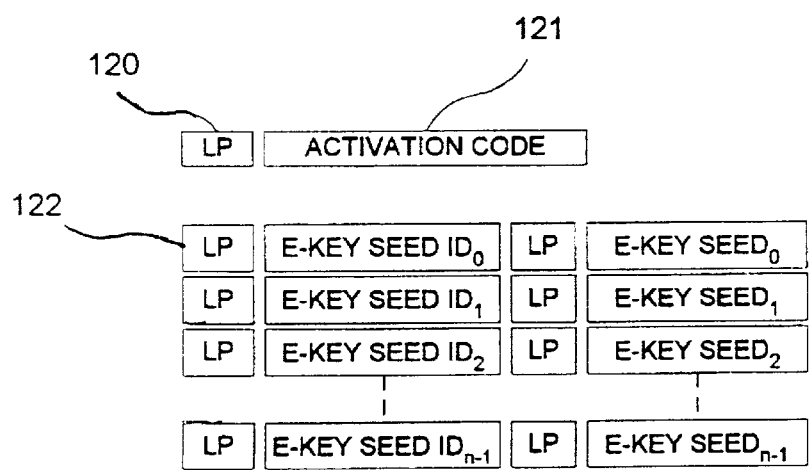
FIG. 4 is a diagram of an E-Key Seed table as stored in EEPROM 110 of the system of FIG. 3.

The E-Key Seed table 113 stored in the EEPROM 110 of FIG. 3 is shown in detail in FIG. 4, where the first information sector of the first line of information is a length parameter LP 120 which specifies the size of the data field that follows. The LP 120 is necessary because the data fields of each table entry are variable in length. The length may be changed as the need for greater security arises. The data field of the first line of table information consists of an activation code 121. The activation code 121 must be entered into the encryption key generator 100 before an encryption key can be generated.

In the second and following lines of table information, an LP 122 precedes each of two data fields. The first data field is an E-Key Seed ID beginning with E-Key Seed $ID_0$ in line 2 and ending with E-Key Seed $ID_{n-1}$ in the nth line. The second data field is an E-Key Seed beginning, with E-Key Seed$_0$ in the second line and ending with E-Key Seed$_{n-1}$ in the nth line. The E-Key Seed ID is a look-up table tag which is paired with a corresponding E-Key Seed in each line of table information.

Figure 5A:
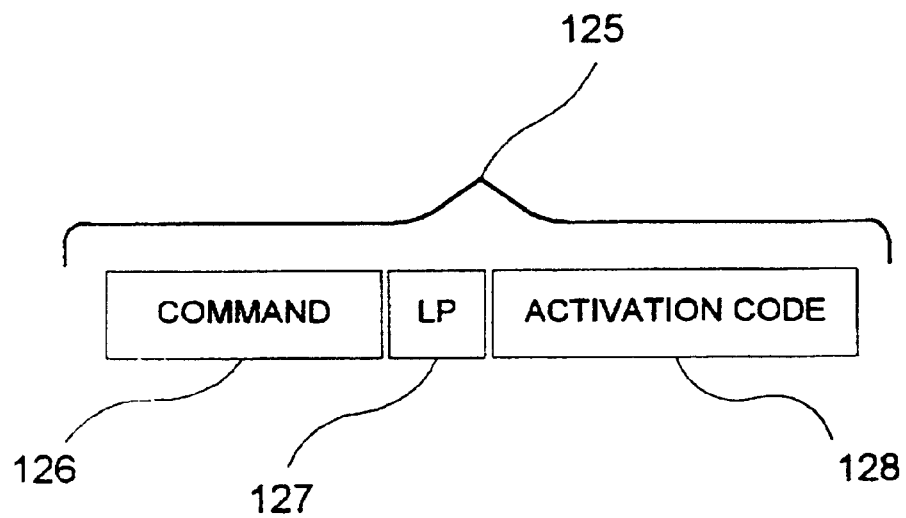
FIG. 5a is an illustration of an activation command sequence from a host system to tile encryption key generator in accordance with the invention.

FIG. 5a shows a command sequence 125 which is issued by the host system to activate the encryption key generator system 100. The command sequence is received over the communication link 101 by the I/O interface unit 102, and the command 126 is recognized by the command interpreter program stored in ROM 114. The CPU 107 retrieves the length parameter (LP) 127 and activation code 128, and enables the encryption key generator system 100.

Figure 5B:
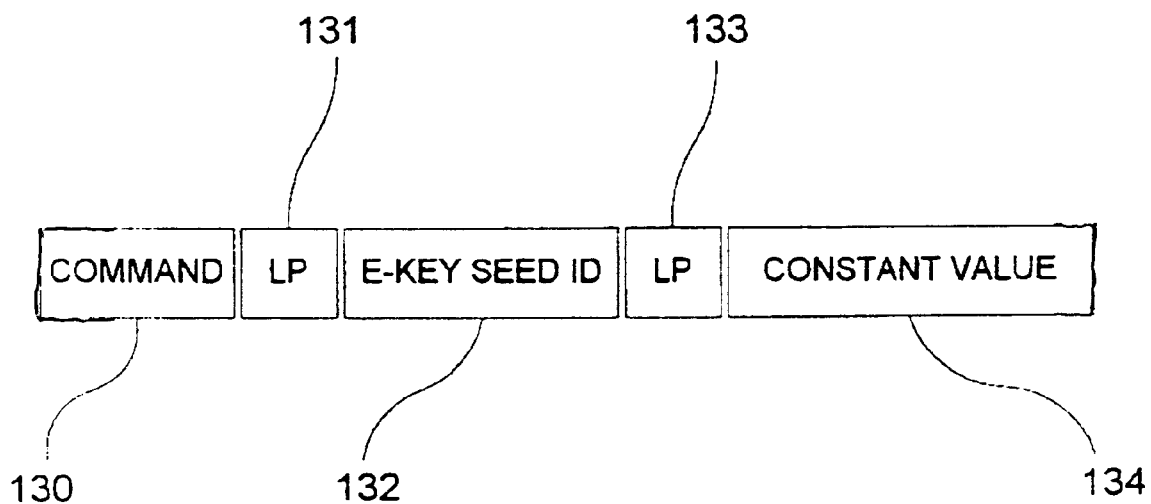
FIG. 5b is an illustration of a transmission command sequence from a host system to the encryption key generator in accordance with the invention.

FIG. 5b depicts a transmission sequence which is transmitted by the host system over communication link 101 to the I/O interface unit 102. The command 130 is recognized by the command interpreter program stored in ROM 114 and executed by the CPU 107. When the command is to generate an encryption key, the command will be followed by LP 131 indicating the length of an E-Key Seed ID data field, an E-Key Seed ID field 132, an LP 133 indicating the length of a constant value data field, and a constant value data field 134. The CPU 107 will store the LP 131, E-Key Seed ID field 132, LP 133 and constant value data field 134 in the RAM 112 for further processing as before described.

Figure 6:
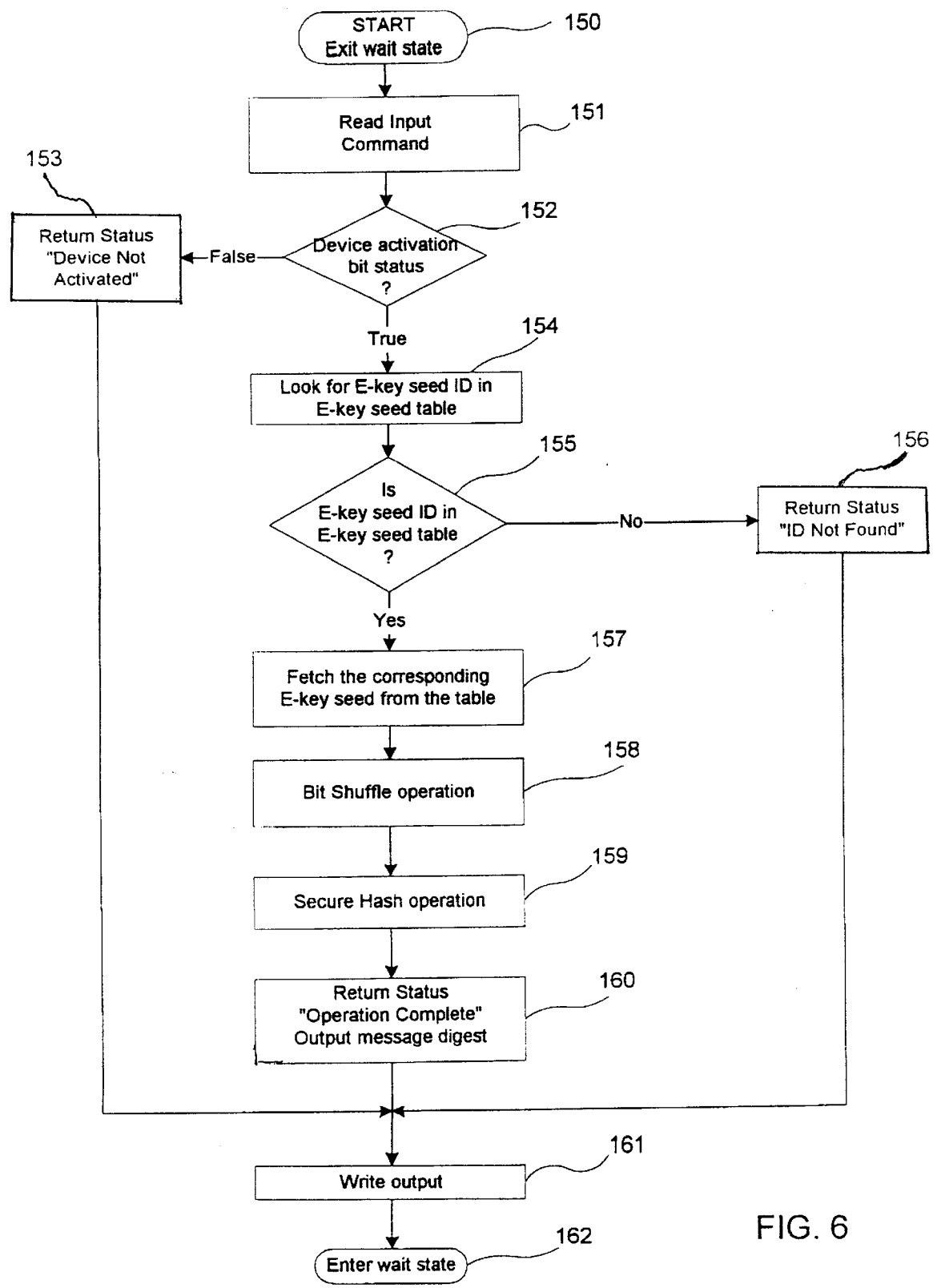
FIG. 6 is a logic flow diagram of an encryption key generation process in accordance with the invention for generating a symmetric, deterministic but non-predictable encryption key.

Referring to FIG. 6, upon the CPU 107 of FIG. 3 being interrupted by the interrupt control unit 104, the CPU exits a wait-state and enters logic step 150 of FIG. 6 to commence the process of generating an encryption key. From logic step 150, the logic flow process proceeds to logic step 151 where the commands in the activation sequence and the transmission sequence of FIGS. 5a and 5b is read, and the remaining fields of the two sequences are stored in RAM 112. Thereafter, the logic process proceeds to logic step 152 to determine whether the activation bit of RAM 112 indicates a true or false condition.

If a false condition is indicated at logic step 152, the logic process transfers to logic step 153 where the message "Device Not Activated" is written into output buffer 117. If a true condition indicating that the key generator has been activated is detected at logic step 152, the logic process proceeds to logic step 154 where the CPU 107 determines whether the E-Key Seed ID stored in RAM 112 also exists in the E-Key Seed table 118 stored in the EEPROM 110 of FIG. 3. If not, the logic process transfers to logic step 156 to store the message "ID Not Found" in the output buffer 117. If the E-Key Seed ID is found in the table, however, the logic flow process proceeds from logic step 155 to logic step 157 to access the E-Key Seed in the table corresponding to the E-Key Seed ID. The E-Key Seed and the constant value stored in RAM 112 then are combined by a bit-shuffle operation at logic step 158, and the result is applied as an input to a Secure Hash Operation at logic step 159 to produce a message digest.

From logic step 159, the logic process proceeds to logic step 160 where the status is reported "Operation Complete" and the message digest is outputted. The encryption key and a message "Operation Complete" also are written to the output buffer 117 of RAM 112.

From logic steps 153, 156 or 160, the logic flow process proceeds to logic step 161 where the contents of the output buffer 117 are written in the I/O interface 102 of FIG. 3 for output to the host system. The computing system to which the encryption key generator system is attached then truncates the message digest to provide a symmetric, and deterministic but non-predictable encryption key. The logic flow process thereafter enters a wait state at logic step 162.

Although particular embodiments of the invention have been described and illustrated herein, it is recognized that modifications and variations may readily occur to those skilled in the art, and consequently it is intended that the claims be interpreted to cover such modifications, variations, and equivalents. For example, the E-Key Seed 50 may vary in bit length, any algebraic, logical or encryption operand may be executed by the bit-shuffling generator 52, and plural bit-shuffling operations may occur throughout the process performed by the encryption key generator 30.

What is claimed is:

1. A method of generating a pseudo-random, symmetric encryption key which is highly resistant to reverse analysis, and which comprises the following steps:

combining a constant value and a secret plural bit sequence to produce a shuffled bit result having fewer than a collective number of bits in said constant value and said secret plural bit sequence;

performing a secure hash operation on said shuffled bit result to produce a message digest; and extracting said pseudo-random, symmetric encryption key from said message digest.

2. The method of claim 1, wherein said secret plural bit sequence has a binary length of at least 224 bits, and said pseudo-random symmetric encryption key has a binary length of at least 112 bits.

3. The method of claim 1, wherein said constant value and said secret plural bit sequence are combined by plural algebraic functions to form said shuffled bit result.

4. The method of claim 1, wherein said constant value and said secret plural bit sequence are encrypted before being combined by an algebraic function to form said shuffled bit result.

5. The method of claim 1, wherein said message digest has a binary length which is less than that of said shuffled bit result.

6. The method of claim 1, wherein said plural bit sequence has a binary length larger than that of said constant value.

7. A system for creating a pseudo-random, symmetric encryption key for use in a computer network system, which comprises:

a first function generator means having a constant value as one input and a secret plural bit sequence as a second input for combining said constant value and said secret plural bit sequence produce a pseudo-random output having fewer than a collective number of bits in said constant value and said secret plural bit sequence;

a secure hash function generator means in electrical communication with said first function generator means and having said pseudo-random output as an input for generating a pseudo-random message digest; and truncation means in electrical communication with said secure hash function generator means and receiving said pseudo-random message digest for truncating said pseudo-random message digest to provide said pseudo-random, symmetric encryption key.

8. The system of claim 7, secret wherein said plural bit sequence has a first binary length larger than that of said constant value, and said pseudo-random output has a second binary length larger than said pseudo-random message digest.

9. The system of claim 7, wherein said constant value and said secret plural bit sequence are combined in accordance with at least one algebraic function.

10. The system of claim 9, wherein said at least one algebraic function is replaced by at least one logic function.

11. The system of claim 7, wherein said secret plural bit sequence and said constant value are encrypted before being combined.

12. An encryption key generator in electrical communication with a host system, which comprises:

an I/O interface means in electrical communication with said host system and receiving command sequences from said host system;

interrupt control means in electrical communication with said I/O interface means for issuing an interrupt signal upon receipt of said command sequences;

a ROM in electrical communication with said I/O interface means and having stored therein operating firmware, a bit-shuffle computer program, and a secure hash computer program;

a RAM in electrical communication with said I/O interface means and said ROM for storing a current E-Key Seed and a constant value;

an EEPROM in electrical communication with said I/O interface means, said ROM, and said RAM, for storing said E-Key Seed and said constant value; and a CPU in electrical communication with said interrupt control, said I/O interface means, said ROM, said RAM, and said EEPROM for executing said bit-shuffle computer program to combine said constant value and said E-Key Seed in a first many-to-few bit mapping, for executing said secure hash algorithm to produce a message digest in a second many-to-few bit mapping, and for extracting a pseudo-random symmetric, encryption key from said message digest and storing said encryption key in said EEPROM.

13. The method of claim 1, wherein said constant value and said secret plural bit sequence are combined by at least one algebraic function.

14. The method of claim 1, wherein said constant value and said secret plural bit sequence are combined by at least one logic function.

15. The method of claim 1, wherein said constant value and said secret plural bit sequence are combined by at least one cryptographic function.

16. The method of claim 1, wherein said constant value and said secret plural bit sequence are combined by any combination of one or more of each of an algebraic function, a logic function, and an encryption function.

17. The method of claim 1, wherein said pseudo-random, symmetric encryption key also is deterministic and non-predictable.

18. The method of claim 1, wherein the step of combining includes plural bit shuffling operations to form said shuffled bit result.

19. The method of claim 1, wherein the step of performing also includes plural bit shuffling functions in forming said message digest.

20. The method of claim 1, wherein said secret plural bit sequence may vary in binary bit length.

21. The system of claim 7, wherein said constant value and said secret plural bit sequence are combined in accordance with at least one cryptographic function.

22. The system of claim 7, wherein said constant value and said secret plural bit sequence are combined by any combination of one or more of each of an algebraic function, a logic function, and an encryption function.

23. The system of claim 7, wherein said pseudo-random, symmetric encryption key also is deterministic and non-predictable.

24. The system of claim 7, wherein said first function generator performs plural bit shuffling functions in combining said constant value and said secret plural bit sequence.

25. The system of claim 7 further including bit shuffling means receiving said pseudo-random message digest from said secure hash function generator means for performing plural bit shuffling operations on said pseudo-random message digest to generate a second pseudo-random message digest which is truncated by said truncation means to provide said pseudo-random, symmetric encryption key.

26. The system of claim 12, wherein said pseudo-random, symmetric encryption key also is deterministic and non-predictable.

27. The system of claim 7, wherein said secret plural bit sequence may vary in binary bit length.

* * * * *

UNITED STATES PATENT AND TRADEMARK OFFICE
CERTIFICATE OF CORRECTION

PATENT NO. : 5,963,646
DATED       : October 5, 1999
INVENTOR(S) : Guy L. Fielder, et. al.

It is certified that error appears in the above-identified patent and that said Letters Patent is hereby corrected as shown below:

Title page, left column, after "Inventors: Guy L. Fielder", delete ", Houston;"

After "Paul N. Alito,", delete "Austin,".

After "both of", add --Austin,--.

Column 1, line 34, before "PC", delete "tile" and add --the--.

Claim 7, column 9, line 23, after "sequence", add --to--.

Signed and Sealed this

Twenty-seventh Day of June, 2000

Attest:

Q. TODD DICKINSON

Attesting Officer            Director of Patents and Trademarks